United States Patent
Chang et al.

(10) Patent No.: US 11,762,179 B2
(45) Date of Patent: Sep. 19, 2023

(54) MICROSCOPE DEVICE WITH INCREASED THREE-DIMENSIONAL IMAGE DEPTH AND METHOD FOR OPERATING THE SAME

(71) Applicants: SOGANG UNIVERSITY RESEARCH & BUSINESS DEVELOPMENT FOUNDATION, Seoul (KR); DAEGU GYEONGBOK INSTITUTE OF SCIENCE AND TECHNOLOGY, Daegu (KR)

(72) Inventors: Jin Ho Chang, Seoul (KR); Sung Hun Park, Daegu (KR)

(73) Assignees: SOGANG UNIVERSITY RESEARCH & BUSINESS DEVELOPMENT FOUNDATION, Seoul (KR); DAEGU GYEONGBOK INSTITUTE OF SCIENCE AND TECHNOLOGY, Daegu (KR)

(*) Notice: Subject to any disclaimer, the term of this patent is extended or adjusted under 35 U.S.C. 154(b) by 184 days.

(21) Appl. No.: 17/413,622

(22) PCT Filed: Feb. 25, 2020

(86) PCT No.: PCT/KR2020/002686
§ 371 (c)(1),
(2) Date: Jun. 14, 2021

(87) PCT Pub. No.: WO2020/175885
PCT Pub. Date: Sep. 3, 2020

(65) Prior Publication Data
US 2022/0035145 A1    Feb. 3, 2022

(30) Foreign Application Priority Data
Feb. 28, 2019   (KR) .................. 10-2019-0024032

(51) Int. Cl.
*G02B 21/00*    (2006.01)

(52) U.S. Cl.
CPC ....... *G02B 21/0028* (2013.01); *G02B 21/008* (2013.01); *G02B 21/0032* (2013.01)

(58) Field of Classification Search
CPC ............ G02B 21/0028; G02B 21/0032; G02B 21/008; G02B 21/00; G02B 21/0004;
(Continued)

(56) References Cited

U.S. PATENT DOCUMENTS

2006/0184042 A1* 8/2006 Wang .................. A61B 5/0073
600/476
2013/0342665 A1* 12/2013 Wang ....................... H04N 5/30
348/61
2016/0356746 A1* 12/2016 Piestun .............. G01N 29/0654

FOREIGN PATENT DOCUMENTS

JP    2013505043    2/2013
JP    2014002318    1/2014
(Continued)

*Primary Examiner* — Arnel C Lavarias
(74) *Attorney, Agent, or Firm* — LEX IP MEISTER, PLLC

(57) ABSTRACT

In a method for operating a microscope, a lens unit transmits a first image laser to an object, and acquire a first scan image on the basis of a first reflection signal reflected from a first area included in the object. An ultrasound conversion unit transmits an ultrasound signal to the first area and focuses same so as to form air bubbles in the first area. The lens unit transmits a second image laser to the object, and can acquire a second scan image on the basis of a second reflection signal reflected from the second area included in the object. The ultrasound conversion unit transmits an ultrasound signal to the first area included in the object and focuses same so as to form air bubbles in the first area, thereby enabling an increase in the imageable depth of a microscope.

16 Claims, 7 Drawing Sheets

(58) Field of Classification Search
CPC .. G02B 21/0052; G02B 21/36; G02B 21/361; G02B 21/365
USPC ........ 359/385, 362, 363, 368, 369, 896, 900
See application file for complete search history.

(56) References Cited

FOREIGN PATENT DOCUMENTS

| | | |
|---|---|---|
| JP | 2015138022 | 7/2015 |
| JP | 2017070608 | 4/2017 |
| KR | 10-2008-0078029 | 8/2008 |
| KR | 10-2012-0096512 | 8/2012 |
| KR | 10-1480337 | 1/2015 |
| KR | 10-2015-0036757 | 4/2015 |
| KR | 10-2018-0113863 | 10/2018 |

* cited by examiner

【FIG. 1】
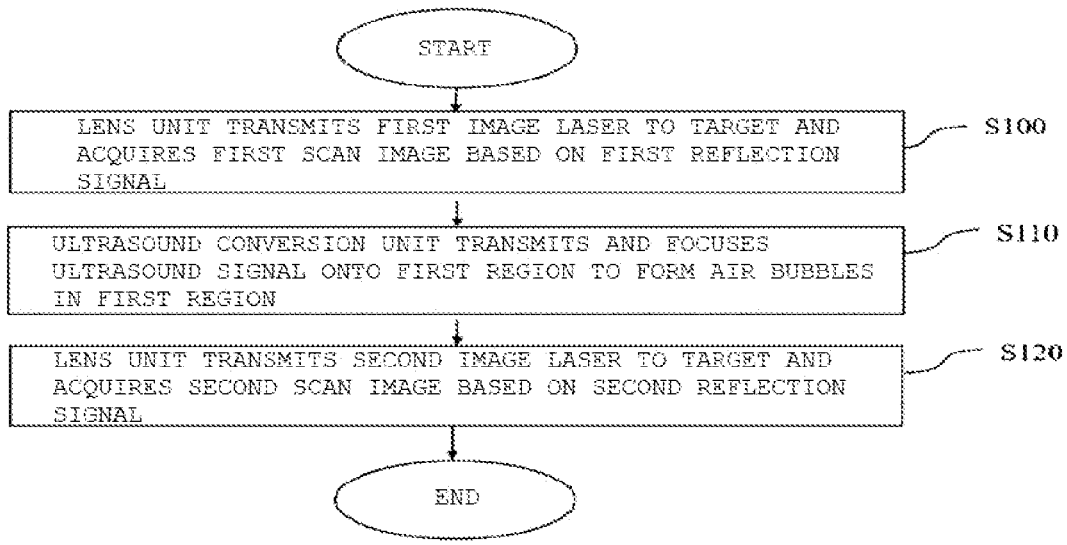
【FIG. 2】
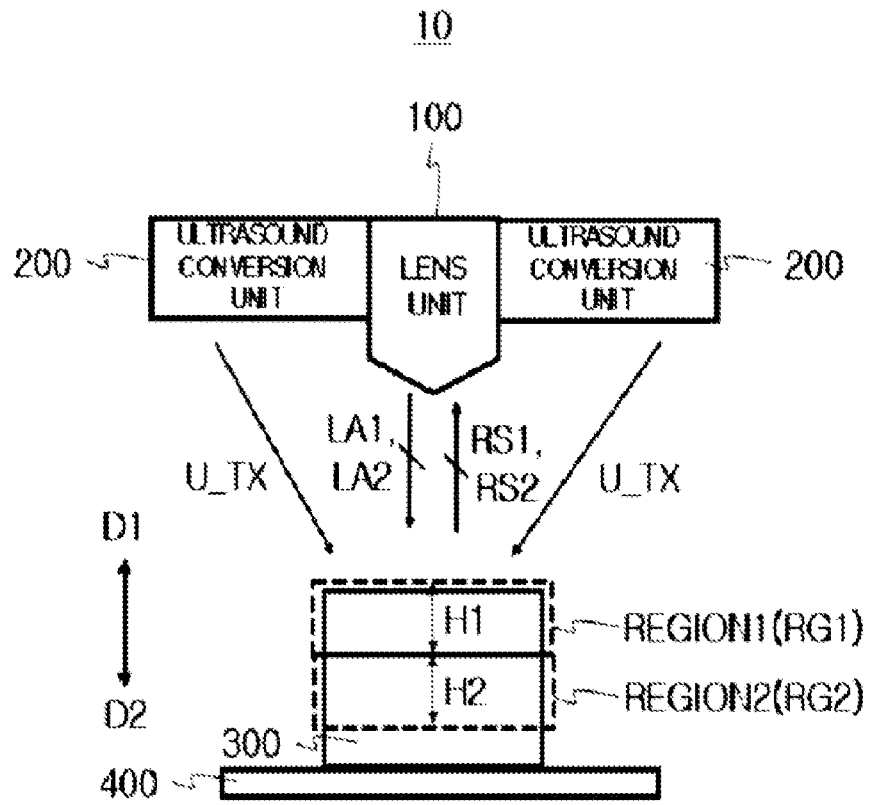

[FIG. 3]
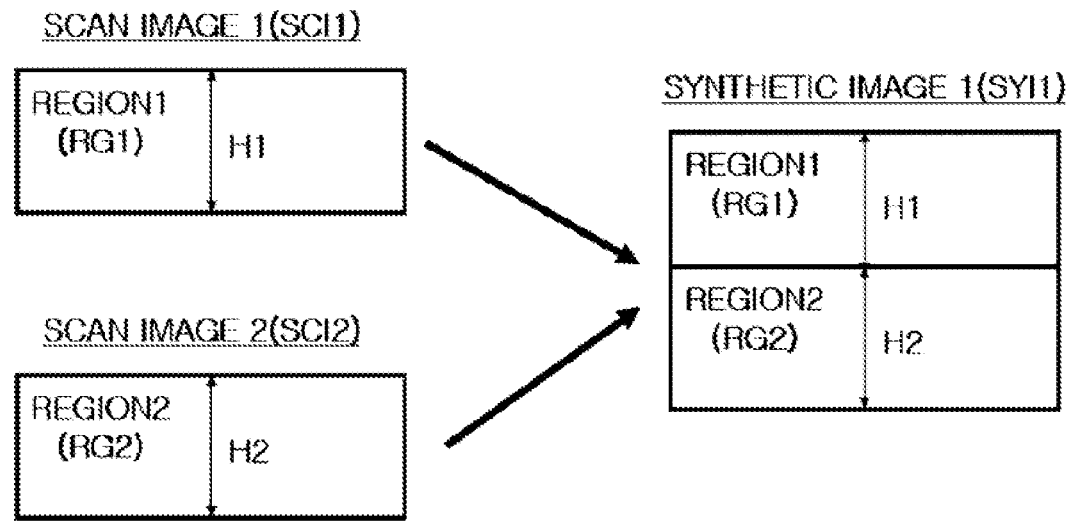
[FIG. 4]
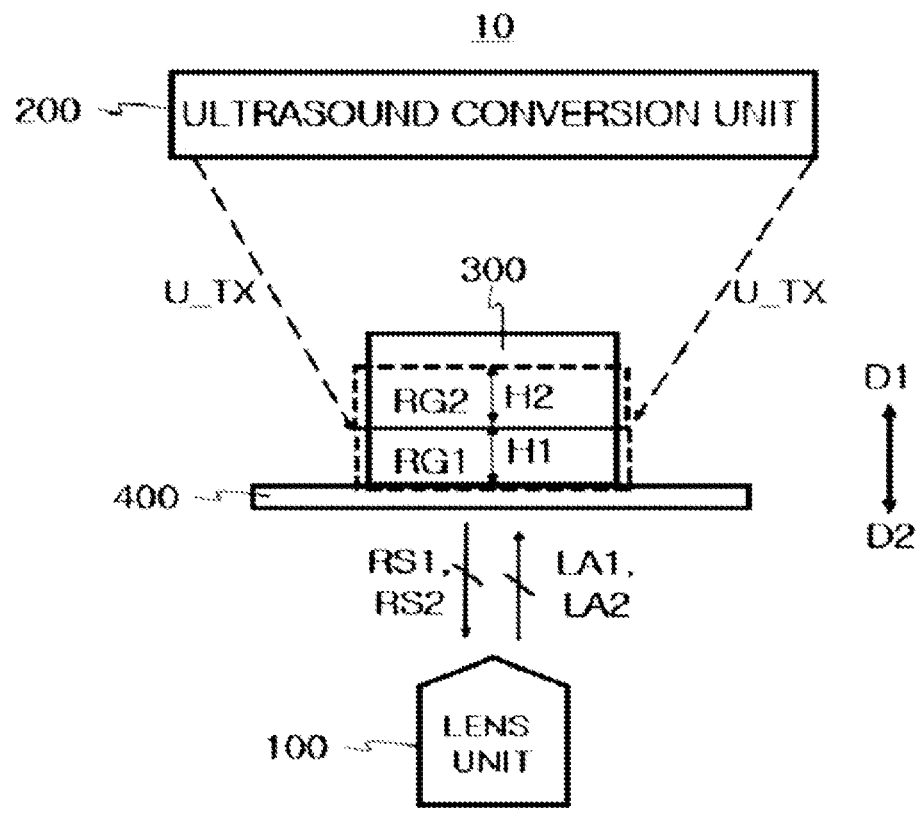

[FIG. 5]
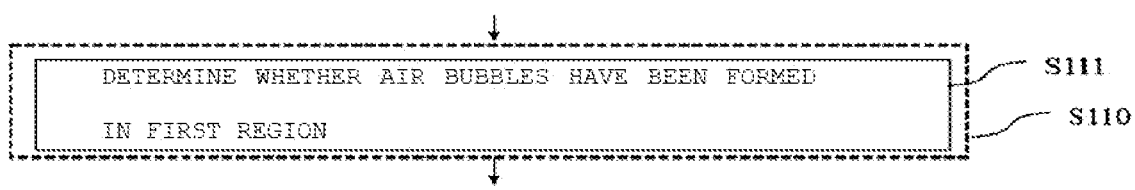
[FIG. 6]
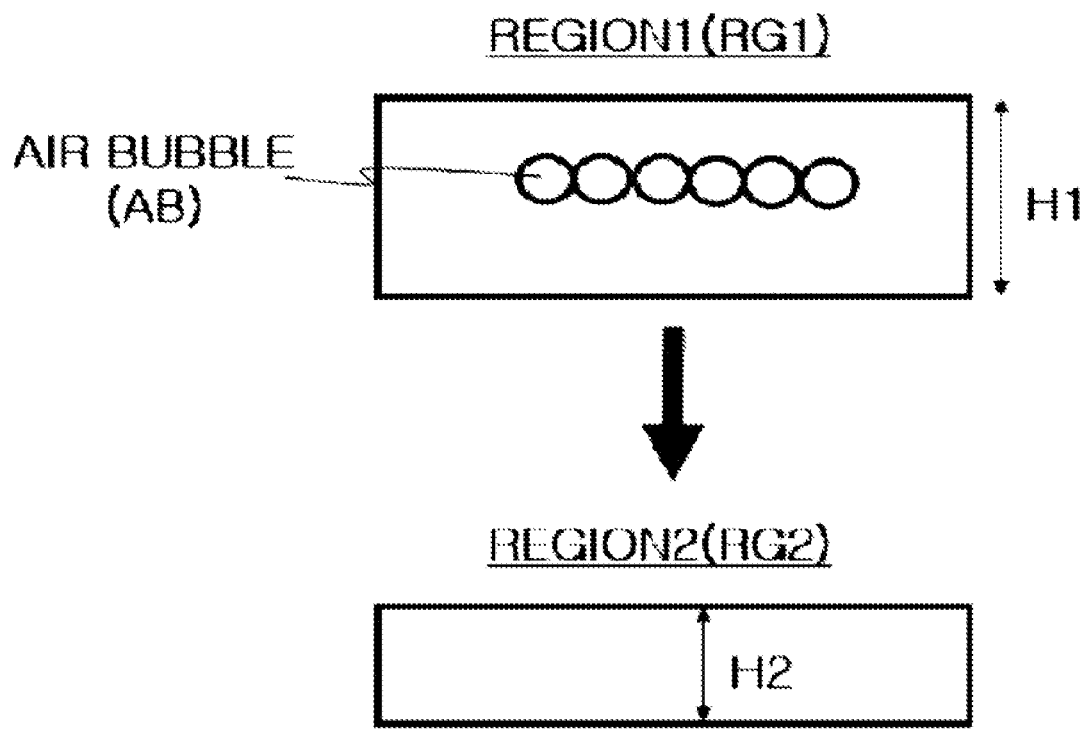

[FIG. 7]
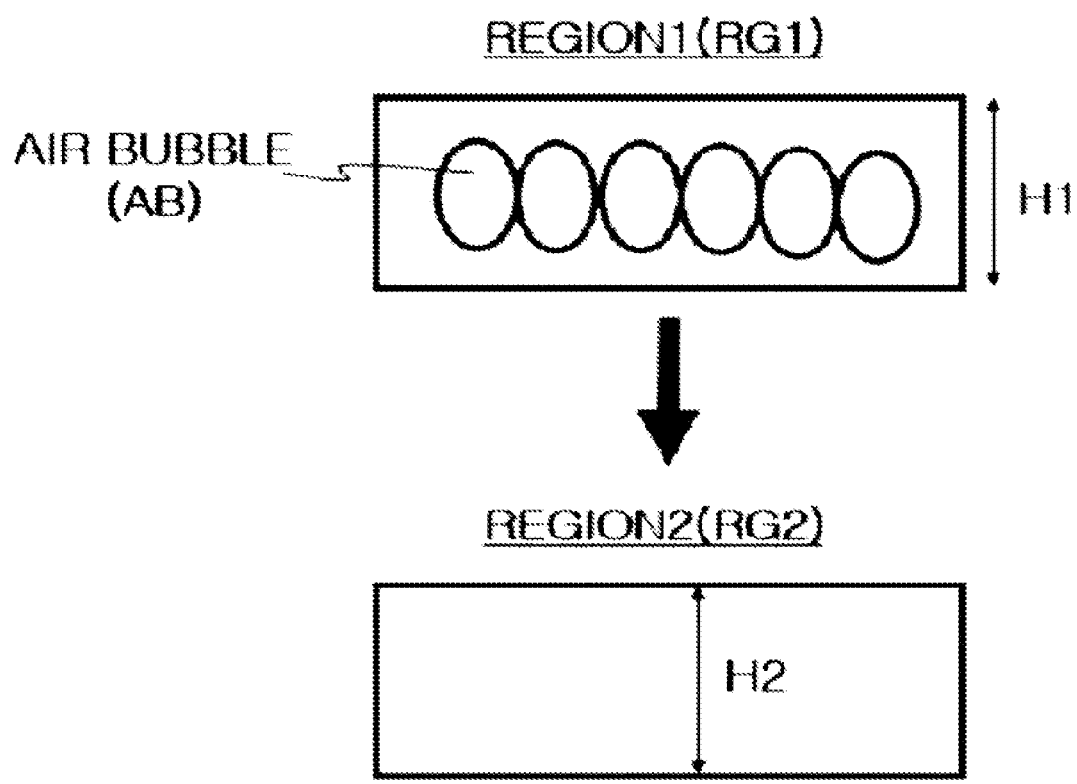
[FIG. 8]
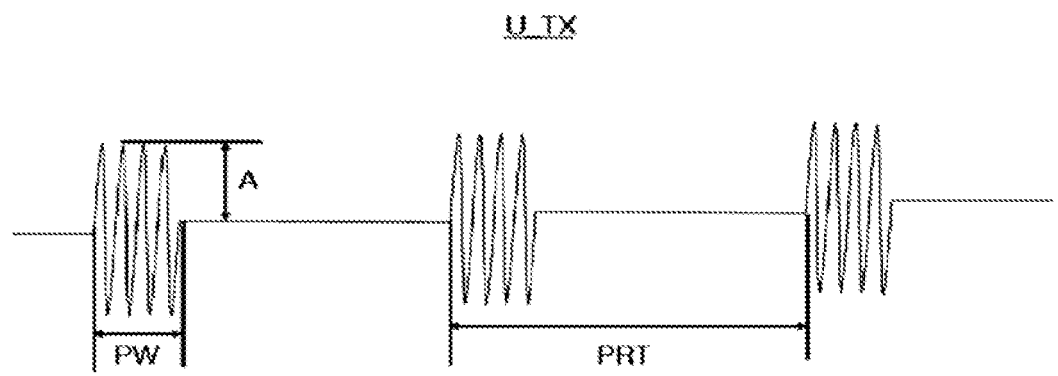

[FIG. 9]
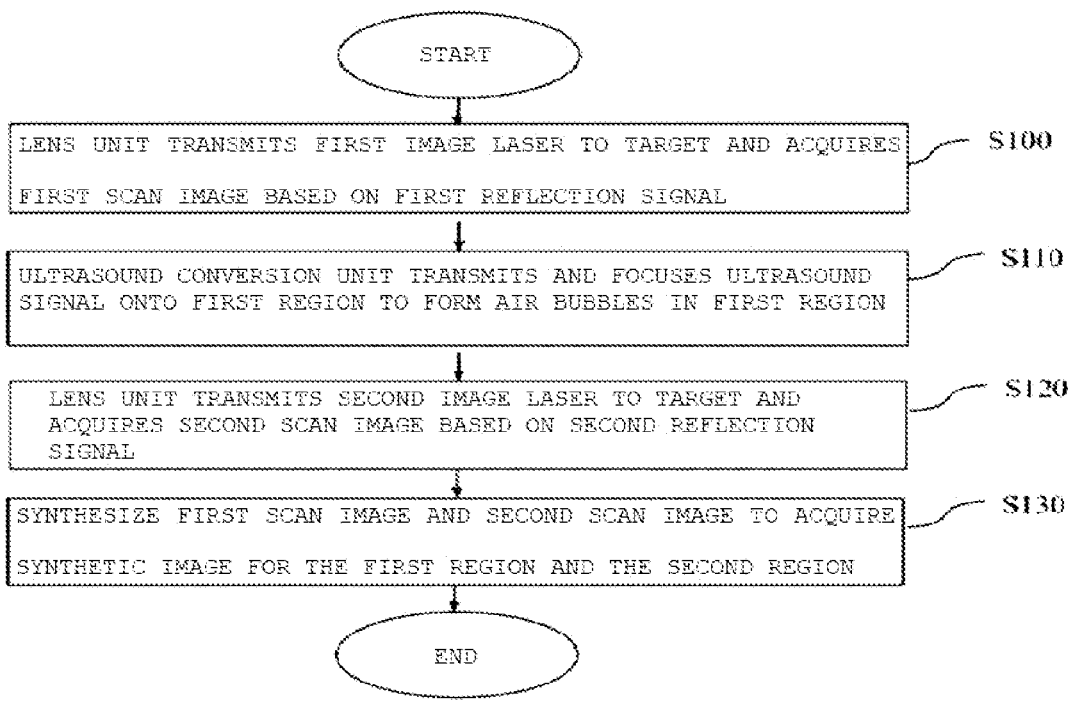
[FIG. 10]
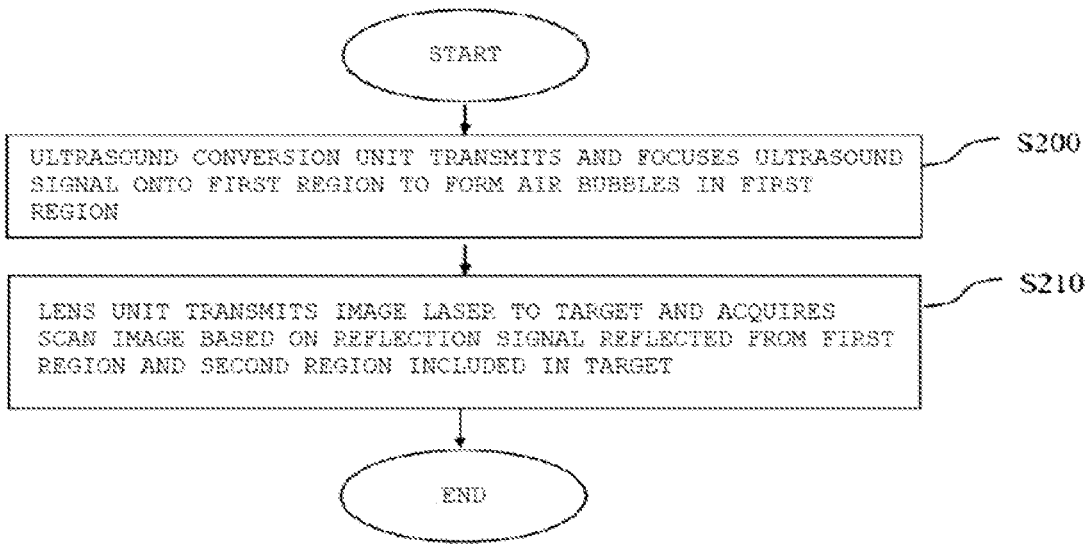

【FIG. 11】
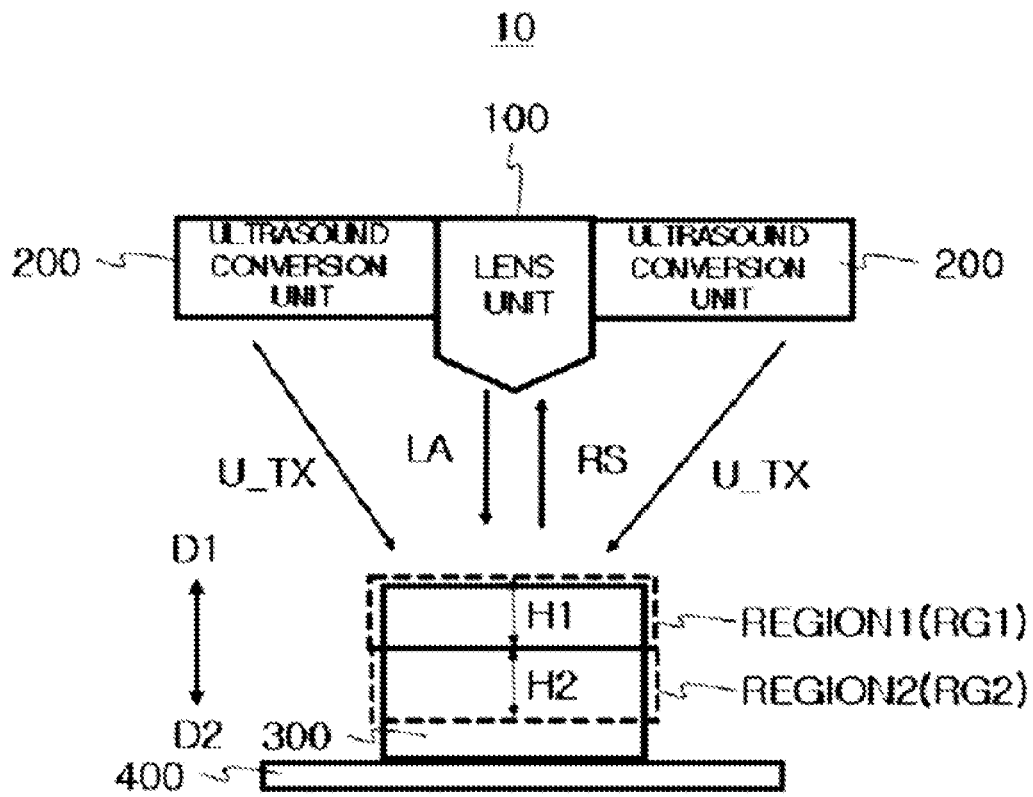
【FIG. 12】
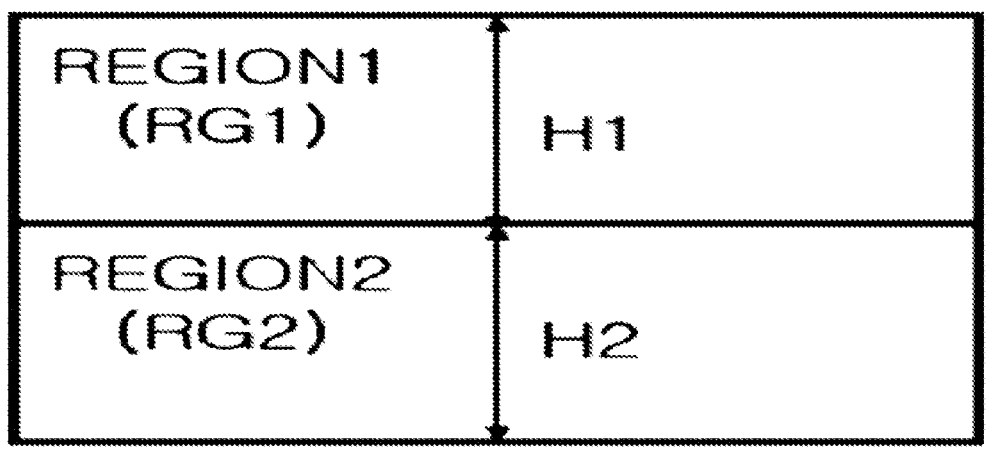

[FIG. 13]
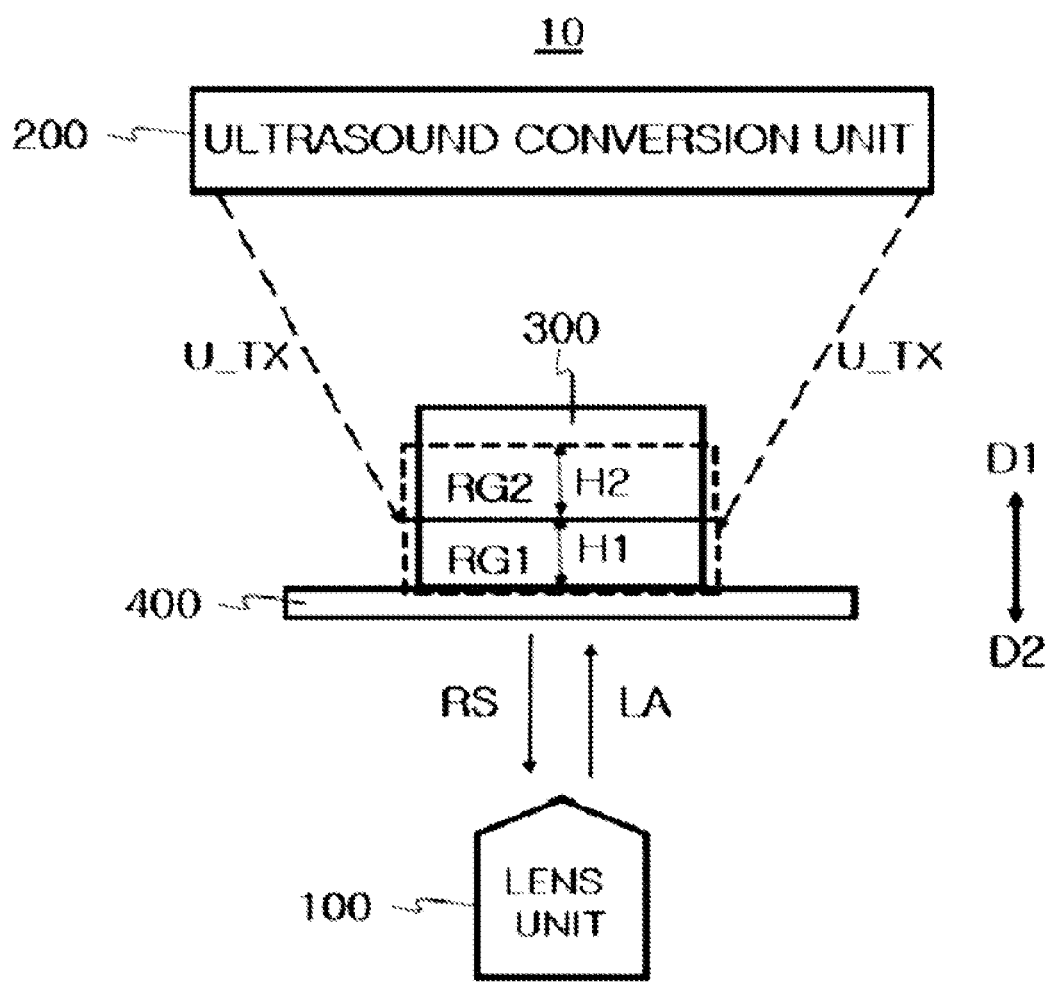

MICROSCOPE DEVICE WITH INCREASED THREE-DIMENSIONAL IMAGE DEPTH AND METHOD FOR OPERATING THE SAME

TECHNICAL FIELD

The present disclosure relates to a microscope device and a method of manufacturing the microscope.

BACKGROUND ART

To date, the three-dimensional image depth of a confocal fluorescence microscope has been limited to 200 to 300 μm. A multiphoton microscope has been developed in order to increase the limited image depth, but has a problem in that image resolution is lowered due to the use of a long wavelength. Guide-star-based optical focusing technology has a problem in that it takes a long time, e.g. several tens of minutes, to perform optical wavefront correction for a single image point. Therefore, various research to increase the three-dimensional image depth has been conducted.

(Korean Registered Patent) 10-0790707 (Registration Date: 2007 Dec. 24)

DISCLOSURE

Technical Problem

It is an object of the present disclosure to provide a microscope device capable of increasing the three-dimensional image depth of a confocal microscope.

It is another object of the present disclosure to provide a method of operating a microscope device capable of increasing the three-dimensional image depth of a confocal microscope.

Technical Solution

In order to accomplish the above objects, in a method of operating a microscope according to an embodiment of the present disclosure, a lens unit may transmit a first image laser to a target and may acquire a first scan image based on a first reflection signal reflected from a first region included in the target. An ultrasound conversion unit may transmit and focus an ultrasound signal onto the first region to form air bubbles in the first region. The lens unit may transmit a second image laser to the target and may acquire a second scan image based on a second reflection signal reflected from a second region included in the target.

In an embodiment, the lens unit may be disposed in a first direction relative to the target, and the ultrasound conversion unit may be disposed in the first direction relative to the target.

In an embodiment, the lens unit may be disposed in the first direction relative to the target, and the ultrasound conversion unit may be disposed in a second direction relative to the target.

In an embodiment, the method may further include determining whether the air bubbles have been formed in the first region.

In an embodiment, upon determining that the air bubbles have not been formed in the first region, the ultrasound conversion unit may focus and retransmit an ultrasound signal to the first region.

In an embodiment, the area of the second region may vary depending on the size of each of the air bubbles.

In an embodiment, the area of the second region may be increased as the size of each of the air bubbles is increased.

In an embodiment, the size of each of the air bubbles may vary depending on the magnitude, pulse width, and pulse repetition time of the ultrasound signal.

In an embodiment, the method may further include synthesizing the first scan image and the second scan image to acquire a synthetic image for the first region and the second region.

In order to accomplish the above objects, a microscope device according to an embodiment of the present disclosure may include a lens unit and an ultrasound conversion unit. The lens unit may transmit a first image laser to a target, may acquire a first scan image based on a first reflection signal reflected from a first region included in the target, may transmit a second image laser to the target after air bubbles are formed in the first region, and may acquire a second scan image based on a second reflection signal reflected from a second region included in the target. The ultrasound conversion unit may transmit and focus an ultrasound signal onto the first region to form the air bubbles in the first region.

In an embodiment, the lens unit may be disposed in the first direction relative to the target, and the ultrasound conversion unit may be disposed in the first direction relative to the target.

In an embodiment, the lens unit may be disposed in the first direction relative to the target, and the ultrasound conversion unit may be disposed in the second direction relative to the target.

In an embodiment, in the case in which the air bubbles have not been formed in the first region, the ultrasound conversion unit may focus and retransmit an ultrasound signal to the first region.

In an embodiment, the microscope device may synthesize the first scan image and the second scan image to acquire a synthetic image for the first region and the second region.

In order to accomplish the above objects, in a method of operating a microscope according to an embodiment of the present disclosure, an ultrasound conversion unit may transmit and focus an ultrasound signal onto a first region included in a target to form air bubbles in the first region. A lens unit may transmit an image laser to the target and may acquire a scan image based on a reflection signal reflected from the first region and a second region included in the target.

In order to accomplish the above objects, a microscope device according to an embodiment of the present disclosure may include an ultrasound conversion unit and a lens unit. The ultrasound conversion unit may transmit and focus an ultrasound signal onto a first region included in a target to form air bubbles in the first region. The lens unit may transmit an image laser to the target and may acquire a scan image based on a reflection signal reflected from the first region and a second region included in the target.

In addition to the technical problem of the present disclosure mention above, other features and advantages of the present disclosure will be described below or may be clearly understood by a person having ordinary skill in the art to which the present disclosure pertains from the description and explanation thereof.

Advantageous Effects

The present disclosure has the following effects.

In a microscope device according to the present disclosure, an ultrasound conversion unit may transmit and focus an ultrasound signal to a first region included in a target to form air bubbles in the first region, whereby the possible image depth of the microscope may be increased.

In a method of operating a microscope according to the present disclosure, an ultrasound conversion unit may transmit and focus an ultrasound signal to a first region included in a target to form air bubbles in the first region, whereby the possible image depth of the microscope may be increased.

In addition, other features and advantages of the present disclosure may be newly understood through embodiments of the present disclosure.

DESCRIPTION OF DRAWINGS

FIG. 1 is a flowchart showing a method of operating a microscope according to embodiments of the present disclosure.

FIG. 2 is a view showing a microscope device according to embodiments of the present disclosure.

FIG. 3 is a view illustrating the operation of a lens unit of FIG. 2.

FIG. 4 is a view showing a microscope device according to other embodiments of the present disclosure.

FIG. 5 is a view showing an example of the method of operating the microscope of FIG. 1.

FIGS. 6 and 7 are views illustrating the area of a second region depending on the size of air bubbles formed in a first region of FIG. 2.

FIG. 8 is a view showing an example of an ultrasound signal transmitted by an ultrasound conversion unit included in the microscope device of FIG. 2.

FIG. 9 is a flowchart showing a method of operating a microscope according to an embodiment of the present disclosure.

FIG. 10 is a flowchart showing a method of operating a microscope according to embodiments of the present disclosure.

FIG. 11 is a view showing a microscope device according to embodiments of the present disclosure.

FIG. 12 is a view illustrating the operation of a lens unit of FIG. 11.

FIG. 13 is a view showing a microscope device according to embodiments of the present disclosure.

BEST MODE

It should be noted that, when denoting elements in respective figures by reference numerals in this specification, the same elements are denoted by the same reference numerals if possible although the elements are shown in different figures.

Meanwhile, meanings of terms used in this specification must be understood as follows.

The singular forms used in this specification are intended to include the plural forms as well, unless the context clearly indicates otherwise, and the scope of right of the present disclosure is not limited by these terms.

It should be understood that the term "includes" or "has" does not preclude the presence or addition of one or more other features, integers, steps, operations, elements, components, or combinations thereof.

Hereinafter, preferred embodiments of the present disclosure devised in order to solve the above problems will be described in detail with reference to the accompanying drawings.

FIG. 1 is a flowchart showing a method of operating a microscope according to embodiments of the present disclosure, FIG. 2 is a view showing a microscope device according to embodiments of the present disclosure, and FIG. 3 is a view illustrating the operation of a lens unit of FIG. 2.

Referring to FIGS. 1 to 3, the microscope device 10 according to the embodiment of the present disclosure may include a lens unit 100 and an ultrasound conversion unit 200. The lens unit 100 may transmit a first image laser LA1 to a target 300, may acquire a first scan image SCI1 based on a first reflection signal RS1 reflected from a first region RG1 included in the target 300, may transmit a second image laser LA2 to the target 300 after air bubbles AB are formed in the first region RG1, and may acquire a second scan image SCI2 based on a second reflection signal RS2 reflected from a second region RG2 included in the target 300. The ultrasound conversion unit 200 may transmit and focus an ultrasound signal U_TX to the first region RG1 to form the air bubbles AB in the first region RG1.

In the method of operating the microscope according to the embodiment of the present disclosure, the lens unit 100 may transmit a first image laser LA1 to a target 300 and may acquire a first scan image SCI1 based on a first reflection signal RS1 reflected from a first region RG1 included in the target 300 (S100). For example, the target 300 may be disposed between the lens unit 100 and a stage 400. The distance between the first region RG1 and the lens unit 100 may be less than the distance between a second region RG2 and the lens unit 100. In the case in which the lens unit 100 transmits the first image laser LA1 to the target 300, the image depth of the first scan image SCI1 acquired based on the first reflection signal RS1 reflected from the first region RG1 may be a first image depth H1. In the case in which an image is formed using a signal reflected from an image depth greater than the first image depth H1, the resolution of the image may be lowered.

The ultrasound conversion unit 200 may transmit and focus an ultrasound signal U_TX onto the first region RG1 to form air bubbles AB in the first region RG1 (S110). For example, the ultrasound conversion unit 200 may focus and transmit the ultrasound signal U_TX to a predetermined portion included in the first region RG1. In the case in which the ultrasound conversion unit 200 focuses and transmits the ultrasound signal U_TX to the predetermined portion included in the first region RG1, the air bubbles AB may be formed in the first region RG1 included in the target 300. The size of the air bubbles AB formed in the first region RG1 included in the target 300 may vary depending on the amplitude A, pulse width PW, and pulse repetition time PRT of the ultrasound signal U_TX.

The lens unit 100 may transmit a second image laser LA2 to the target 300 and may acquire a second scan image SCI2 based on a second reflection signal RS2 reflected from a second region RG2 included in the target 300 (S120). For example, in the case in which the second image laser LA2 is transmitted to the target 300 after the air bubbles AB are formed in the first region RG1, the second image laser LA2 may be Mie scattered by the air bubbles AB formed in the first region RG1. In the case in which the second image laser LA2 is Mie scattered by the air bubbles AB formed in the first region RG1, the depth by which the second image laser LA2 penetrates the target 300 may be further increased. In this case, the second scan image SCI2 may be acquired based on the second reflection signal RS2 reflected from the second region RG2. In the case in which no air bubbles AB have been formed in the first region RG1, on the other hand, the second image laser LA2 may not be Mie scattered but may be Rayleigh scattered. In the case in which the second image laser LA2 is Rayleigh scattered in the first region RG1, the depth by which the second image laser LA2 penetrates the target 300 may not be increased. In this case, the resolution of the second scan image SCI2 formed based on the second reflection signal RS2 reflected from the second region RG2 may be lowered.

The lens unit 100 may synthesize the first scan image SCI1 and the second scan image SCI2 to acquire a synthetic image SY1 for the first region RG1 and the second region RG2. For example, the lens unit 100 may transmit the first image laser LA1 to the target 300 and may acquire the first scan image SCI1 based on the first reflection signal RS1 reflected from the first region RG1 included in the target 300. In addition, after the air bubbles AB are formed in the first region RG1, the lens unit 100 may transmit the second image laser LA2 to the target 300 and may acquire the second scan image SCI2 based on the second reflection signal RS2 reflected from the second region RG2 included in the target 300. The lens unit 100 may use the first scan image SCI1 up to the first image depth H1 of the first region RG1 and may use the second scan image SCI2 up to a second image depth H2 of the second region RG2 to provide the synthetic image SY1 for the first region RG1 and the second region RG2.

In an embodiment, the lens unit 100 may be disposed in a first direction D1 based on the target 300, and the ultrasound conversion unit 200 may be disposed in the first direction D1 based on the target 300. For example, in the case in which the lens unit 100 is disposed in the first direction D1 based on the target 300 and the ultrasound conversion unit 200 is disposed in the first direction D1 based on the target 300, the lens unit 100 and the ultrasound conversion unit 200 are shown as being separated from each other, as shown in FIG. 2, which is a sectional view of the microscope device 10. Actually, however, the lens unit 100 may be configured to be surrounded by the ultrasound conversion unit 200. In order to generate the air bubbles AB induced by the ultrasound signal U_TX, the operating frequency of an ultrasound converter included in the ultrasound conversion unit 200 may have a value between 1 MHz and 100 MHz, and the F-number, which is the ratio of the diameter of the ultrasound converter to the length of a ultrasound focusing point, may have a value of 0.5 to 1.5.

In the method of operating the microscope according to the present disclosure, the ultrasound conversion unit 200 may transmit and focus the ultrasound signal U_TX onto the first region RG1 included in the target 300 to form the air bubbles AB in the first region RG1, whereby the possible image depth of the microscope may be increased.

FIG. 4 is a view showing a microscope device according to other embodiments of the present disclosure.

Referring to FIG. 4, the microscope device 10 according to the embodiment of the present disclosure may include a lens unit 100 and an ultrasound conversion unit 200. The lens unit 100 may transmit a first image laser LA1 to a target 300, may acquire a first scan image SCI1 based on a first reflection signal RS1 reflected from a first region RG1 included in the target 300, may transmit a second image laser LA2 to the target 300 after air bubbles AB are formed in the first region RG1, and may acquire a second scan image SCI2 based on a second reflection signal RS2 reflected from a second region RG2 included in the target 300. The ultrasound conversion unit 200 may transmit and focus an ultrasound signal U_TX onto the first region RG1 to form the air bubbles AB in the first region RG1.

In an embodiment, the lens unit 100 may be disposed in the first direction D1 based on the target 300, and the ultrasound conversion unit 200 may be disposed in a second direction D2 based on the target 300. For example, the target 300 may be disposed between the lens unit 100 and a stage 400. The distance between the first region RG1 and the lens unit 100 may be less than the distance between the second region RG2 and the lens unit 100. Also, in the case in which the lens unit 100 is disposed in the first direction D1 based on the target 300 and the ultrasound conversion unit 200 is disposed in the second direction D2 based on the target 300, the lens unit 100 and the ultrasound conversion unit 200 may be disposed so as to be separated from each other, whereby the ultrasound conversion unit 200 may easily focus the ultrasound signal U_TX and actual realization thereof may be easily achieved.

FIG. 5 is a view showing an example of the method of operating the microscope of FIG. 1.

Referring to FIGS. 1 to 5, the method of operating the microscope according to the present disclosure may further include a step of determining whether the air bubbles AB have been formed in the first region RG1 (S111). For example, in the case in which no air bubbles AB have been formed in the first region RG1, the resolution of the second scan image SCI2 acquired through the second image laser LA2 may be lowered. After the ultrasound conversion unit 200 focuses and transmits the ultrasound signal U_TX to the first region RG1, therefore, it is necessary to determine whether the air bubbles AB have been formed in the first region RG1. As a method of determining whether the air bubbles AB have been formed, the first scan image SCI1 may be further acquired to determine whether the air bubbles AB have been formed, or whether the air bubbles have been formed may be determined using ultrasound image equipment and other methods.

In an embodiment, in the case in which no air bubbles AB have been formed in the first region RG1, the ultrasound conversion unit 200 may focus and retransmit an ultrasound signal U_TX to the first region RG1. For example, in the case in which no air bubbles AB have been formed in the first region RG1, the ultrasound conversion unit 200 may adjust the amplitude A, pulse width PW, and pulse repetition time PRT of the ultrasound signal U_TX in order to form the air bubbles AB in the first region RG1 included in the target 300. In the case in which the ultrasound conversion unit 200 adjusts the magnitude A, pulse width PW, and pulse repetition time PRT of the ultrasound signal U_TX and focuses and retransmits the ultrasound signal U_TX to the first region RG1, the air bubbles AB may be formed in the first region RG1.

FIGS. 6 and 7 are views illustrating the area of the second region depending on the size of the air bubbles formed in the first region of FIG. 2.

Referring to FIGS. 6 and 7, the area of the second region RG2 may vary depending on the size of the air bubbles AB. In an embodiment, as the size of the air bubbles AB is increased, the area of the second region RG2 may be increased. For example, in the case in which the size of the air bubbles AB formed in the first region RG1 is small, the magnitude of Mie scattering of the second image laser LA2 caused by the air bubbles AB formed in the first region RG1 may be small. In the case in which the magnitude of Mie scattering of the second image laser LA2 caused by the air bubbles AB formed in the first region RG1 is small, the penetration depth of the second image laser LA2 may be small. In the case in which the penetration depth of the second image laser LA2 is small, the second image depth H2 of the second region RG2 may be small. In the case in which the second image depth H2 of the second region RG2 is small, the area of the second region RG2 may be small.

In the case in which the size of the air bubbles AB formed in the first region RG1 is greater than the size of the air bubbles AB of FIG. 6, on the other hand, the magnitude of Mie scattering of the second image laser LA2 caused by the air bubbles AB formed in the first region RG1 may be large. In the case in which the magnitude of Mie scattering of the second image laser LA2 caused by the air bubbles AB formed in the first region RG1 is large, the penetration depth of the second image laser LA2 may be greater than in the case of FIG. 6. In the case in which the penetration depth of the second image laser LA2 is large, the second image depth H2 of the second region RG2 may be greater than in the case of FIG. 6. In the case in which the second image depth H2 of the second region RG2 is large, the area of the second region RG2 may be large.

FIG. 8 is a view showing an example of the ultrasound signal transmitted by the ultrasound conversion unit included in the microscope device of FIG. 2.

Referring to FIG. 8, the size of the air bubbles AB may vary depending on the amplitude A, pulse width PW, and pulse repetition time PRT of the ultrasound signal U_TX. For example, in the case in which the amplitude A of the ultrasound signal U_TX transmitted by the ultrasound conversion unit 200 is smaller, the size of the air bubbles AB may be smaller. In the case in which the pulse width PW of the ultrasound signal U_TX transmitted by the ultrasound conversion unit is smaller, the size of the air bubbles AB may be smaller. Also, in the case in which the pulse repetition time PRT of the ultrasound signal U_TX transmitted by the ultrasound conversion unit is larger, the size of the air bubbles AB may be smaller. In an embodiment, the number of the air bubbles AB may vary depending on the amplitude A, pulse width PW, and pulse repetition time PRT of the ultrasound signal U_TX.

FIG. 9 is a flowchart showing a method of operating a microscope according to an embodiment of the present disclosure.

Referring to FIG. 9, in the method of operating the microscope according to the embodiment of the present disclosure, the lens unit 100 may transmit a first image laser LA1 to a target 300 and may acquire a first scan image SCI1 based on a first reflection signal RS1 reflected from a first region RG1 included in the target 300 (S100). The ultrasound conversion unit 200 may transmit and focus an ultrasound signal U_TX to the first region RG1 to form air bubbles AB in the first region RG1 (S110). The lens unit 100 may transmit a second image laser LA2 to the target 300 and may acquire a second scan image SCI2 based on a second reflection signal RS2 reflected from a second region RG2 included in the target 300 (S120). In an embodiment, the method of operating the microscope may further include a step (S130) of synthesizing the first scan image SCI1 and the second scan image SCI2 to acquire a synthetic image SY1 for the first region RG1 and the second region RG2.

The lens unit 100 may synthesize the first scan image SCI1 and the second scan image SCI2 to acquire a synthetic image SY1 for the first region RG1 and the second region RG2. For example, the lens unit 100 may transmit the first image laser LA1 to the target 300 and may acquire the first scan image SCI1 based on the first reflection signal RS1 reflected from the first region RG1 included in the target 300. In addition, after the air bubbles AB are formed in the first region RG1, the lens unit 100 may transmit the second image laser LA2 to the target 300 and may acquire the second scan image SCI2 based on the second reflection signal RS2 reflected from the second region RG2 included in the target 300. The lens unit 100 may use the first scan image SCI1 up to a first image depth H1 of the first region RG1 and may use the second scan image SCI2 up to a second image depth H2 of the second region RG2 to provide the synthetic image SY1 for the first region RG1 and the second region RG2.

Referring to FIGS. 2 and 4, the microscope device 10 according to the embodiment of the present disclosure may include a lens unit 100 and an ultrasound conversion unit 200. The lens unit 100 may transmit a first image laser LA1 to a target 300, may acquire a first scan image SCI1 based on a first reflection signal RS1 reflected from a first region RG1 included in the target 300, may transmit a second image laser LA2 to the target 300 after air bubbles AB are formed in the first region RG1, and may acquire a second scan image SCI2 based on a second reflection signal RS2 reflected from a second region RG2 included in the target 300. The ultrasound conversion unit 200 may transmit and focus an ultrasound signal U_TX to the first region RG1 to form the air bubbles AB in the first region RG1.

In an embodiment, the lens unit 100 may be disposed in the first direction D1 based on the target 300, and the ultrasound conversion unit 200 may be disposed in the first direction D1 based on the target 300. In an embodiment, the lens unit 100 may be disposed in the first direction D1 based on the target 300, and the ultrasound conversion unit 200 may be disposed in the second direction D2 based on the target 300.

In an embodiment, in the case in which no air bubbles AB have been formed in the first region RG1, the ultrasound conversion unit 200 may focus and retransmit an ultrasound signal U_TX to the first region RG1.

In the microscope device 10 according to the present disclosure, the ultrasound conversion unit 200 may transmit and focus the ultrasound signal U_TX to the first region RG1 included in the target 300 to form the air bubbles AB in the first region RG1, whereby the possible image depth of the microscope may be increased.

FIG. 10 is a flowchart showing a method of operating a microscope according to embodiments of the present disclosure, FIG. 11 is a view showing a microscope device according to embodiments of the present disclosure, and FIG. 12 is a view illustrating the operation of a lens unit of FIG. 11.

Referring to FIGS. 10 to 12, the microscope device 10 according to the embodiment of the present disclosure may include an ultrasound conversion unit 200 and a lens unit 100. The ultrasound conversion unit 200 may transmit and focus an ultrasound signal U_TX onto a first region RG1 included in a target 300 to form air bubbles AB in the first region RG1. The lens unit 100 may transmit an image laser LA to the target 300 and may acquire a scan image SCI based on a reflection signal RS reflected from the first region RG1 and a second region RG2 included in the target 300.

In the method of operating the microscope according to the embodiment of the present disclosure, the ultrasound conversion unit 200 may transmit and focus an ultrasound signal U_TX onto a first region RG1 included in a target 300 to form air bubbles AB in the first region RG1 (S200). For example, the ultrasound conversion unit 200 may focus and transmit the ultrasound signal U_TX to a predetermined portion included in the first region RG1. In the case in which the ultrasound conversion unit 200 focuses and transmits the ultrasound signal U_TX to the predetermined portion included in the first region RG1, the air bubbles AB may be formed in the first region RG1 included in the target 300. The size of the air bubbles AB formed in the first region RG1 included in the target 300 may vary depending on the amplitude A, pulse width PW, and pulse repetition time PRT of the ultrasound signal U_TX.

The lens unit 100 may transmit an image laser LA to the target 300 and may acquire a scan image SCI based on a reflection signal RS reflected from the first region RG1 and a second region RG2 included in the target 300 (S210). For example, in the case in which the image laser LA is transmitted to the target 300 after the air bubbles AB are formed in the first region RG1, the image laser LA may be Mie scattered by the air bubbles AB formed in the first region RG1. In the case in which the image laser LA is Mie scattered by the air bubbles AB formed in the first region RG1, the depth by which the image laser LA penetrates the target 300 may be further increased. In this case, the scan image SCI may be acquired based on the reflection signal RS reflected from the second region RG2. In the case in which no air bubbles AB have been formed in the first region RG1, on the other hand, the image laser LA may not be Mie scattered but may be Rayleigh scattered. In the case in which the image laser LA is Rayleigh scattered in the first region RG1, the depth by which the image laser LA penetrates the target 300 may not be increased. In this case, the resolution of the scan image SCI formed based on the reflection signal RS reflected from the second region RG2 may be lowered.

The lens unit 100 may transmit the image laser LA to the target 300 and may acquire the scan image SCI for the first region RG1 and the second region RG2 at once based on the reflection signal RS reflected from the first region RG1 and the second region RG2 included in the target 300.

In an embodiment, the lens unit 100 may be disposed in the first direction D1 based on the target 300, and the ultrasound conversion unit 200 may be disposed in the first direction D1 based on the target 300. For example, in the case in which the lens unit 100 is disposed in the first direction D1 based on the target 300 and the ultrasound conversion unit 200 is disposed in the first direction D1 based on the target 300, the lens unit 100 and the ultrasound conversion unit 200 are shown as being separated from each other, as shown in FIG. 2, which is a sectional view of the microscope device 10. Actually, however, the lens unit 100 may be configured to be surrounded by the ultrasound conversion unit 200.

FIG. 13 is a view showing a microscope device according to embodiments of the present disclosure.

Referring to FIG. 13, the microscope device 10 according to the embodiment of the present disclosure may include an ultrasound conversion unit 200 and a lens unit 100. The ultrasound conversion unit 200 may transmit and focus an ultrasound signal U_TX onto a first region RG1 included in a target 300 to form air bubbles AB in the first region RG1. The lens unit 100 may transmit an image laser LA to the target 300 and may acquire a scan image SCI based on a reflection signal RS reflected from the first region RG1 and a second region RG2 included in the target 300.

In an embodiment, the lens unit 100 may be disposed in the first direction D1 based on the target 300, and the ultrasound conversion unit 200 may be disposed in the second direction D2 based on the target 300. For example, the target 300 may be disposed between the lens unit 100 and a stage 400. The distance between the first region RG1 and the lens unit 100 may be less than the distance between the second region RG2 and the lens unit 100. Also, in the case in which the lens unit 100 is disposed in the first direction D1 based on the target 300 and the ultrasound conversion unit 200 is disposed in the second direction D2 based on the target 300, the lens unit 100 and the ultrasound conversion unit 200 may be disposed so as to be separated from each other, whereby the ultrasound conversion unit 200 may easily focus the ultrasound signal U_TX and actual realization thereof may be easily achieved.

In the microscope device 10 according to the present disclosure, the ultrasound conversion unit 200 may transmit and focus the ultrasound signal U_TX onto the first region RG1 included in the target 300 to form the air bubbles AB in the first region RG1, whereby the possible image depth of the microscope may be increased.

The invention claimed is:

1. A method of operating a microscope, the method comprising:
   transmitting a first image laser to a target and acquiring a first scan image based on a first reflection signal reflected from a first region included in the target by a lens unit;
   transmitting and focusing an ultrasound signal onto the first region to form air bubbles in the first region by an ultrasound conversion unit; and
   transmitting a second image laser to the target and acquiring a second scan image based on a second reflection signal reflected from a second region included in the target by the lens unit.

2. The method according to claim 1, wherein
   the lens unit is disposed in a first direction relative to the target, and the ultrasound conversion unit is disposed in the first direction relative to the target.

3. The method according to claim 1, wherein
   the lens unit is disposed in a first direction relative to the target, and the ultrasound conversion unit is disposed in a second direction relative to the target.

4. The method according to claim 1, further comprising determining whether the air bubbles have been formed in the first region.

5. The method according to claim 4, wherein, upon determining that the air bubbles have not been formed in the first region, the ultrasound conversion unit focuses and retransmits an ultrasound signal to the first region.

6. The method according to claim 1, wherein an area of the second region varies depending on a size of each of the air bubbles.

7. The method according to claim 6, wherein the area of the second region is increased as the size of each of the air bubbles is increased.

8. The method according to claim 7, wherein the size of each of the air bubbles varies depending on a magnitude, pulse width, and pulse repetition time of the ultrasound signal.

9. The method according to claim 1, further comprising synthesizing the first scan image and the second scan image to acquire a synthetic image for the first region and the second region.

10. A microscope device comprising:
    a lens unit configured to transmit a first image laser to a target, to acquire a first scan image based on a first reflection signal reflected from a first region included in the target, to transmit a second image laser to the target after air bubbles are formed in the first region, and to acquire a second scan image based on a second reflection signal reflected from a second region included in the target; and
    an ultrasound conversion unit configured to transmit and focus an ultrasound signal onto the first region to form the air bubbles in the first region.

11. The microscope device according to claim 10, wherein the lens unit is disposed in a first direction relative to the target, and the ultrasound conversion unit is disposed in the first direction relative to the target.

12. The microscope device according to claim 10, wherein
the lens unit is disposed in a first direction relative to the target, and the ultrasound conversion unit is disposed in a second direction relative to the target.

13. The microscope device according to claim 10, wherein, in a case in which the air bubbles have not been formed in the first region, the ultrasound conversion unit focuses and retransmits an ultrasound signal to the first region.

14. The microscope device according to claim 10, wherein the microscope device synthesizes the first scan image and the second scan image to acquire a synthetic image for the first region and the second region.

15. A method of operating a microscope, the method comprising:
transmitting and focusing an ultrasound signal onto a first region included in a target to form air bubbles in the first region by an ultrasound conversion unit; and
transmitting an image laser to the target and acquiring a scan image based on a reflection signal reflected from the first region and a second region included in the target by a lens unit.

16. A microscope device comprising:
an ultrasound conversion unit configured to transmit and focus an ultrasound signal onto a first region included in a target to form air bubbles in the first region; and
a lens unit configured to transmit an image laser to the target and to acquire a scan image based on a reflection signal reflected from the first region and a second region included in the target.

* * * * *